United States Patent [19]

Oosterhouse

[11] 3,964,025

[45] June 15, 1976

[54] SOLID STATE SEARCH UNIT FOR AUTOMATIC PHONOGRAPH

[75] Inventor: Gerard J. Oosterhouse, Grand Rapids, Mich.

[73] Assignee: Rowe International Inc., Whippany, N.J.

[22] Filed: Nov. 22, 1974

[21] Appl. No.: 526,098

[52] U.S. Cl. .................................. 340/162; 194/15
[51] Int. Cl.[2] .................. G11B 19/08; G06F 11/00; H04Q 9/14
[58] Field of Search .......... 340/162, 183, 151, 152, 340/168 S; 194/15; 221/5

[56] References Cited
UNITED STATES PATENTS

| | | | |
|---|---|---|---|
| 3,541,514 | 11/1970 | Dabrowski | 340/162 |
| 3,701,970 | 10/1972 | Jachimek et al. | 340/162 |
| 3,705,423 | 12/1972 | Jachimek et al. | 340/168 R |
| 3,739,342 | 6/1973 | Kortenhaus | 340/162 |
| 3,760,367 | 9/1973 | Kortenhaus | 340/162 X |
| 3,800,285 | 3/1974 | Peschke et al. | 340/162 |

Primary Examiner—Donald J. Yusko
Attorney, Agent, or Firm—Shenier & O'Connor

[57] ABSTRACT

A solid state search unit for use in an automatic phonograph system in which phonograph selections are identified by three digit selection identification numbers, and which system includes a record magazine, a playing mechanism and a plurality of user-actuated remote selectors. In its normal mode of operation, the search unit, in cyclical fashion, searches memory locations corresponding to the respective selections offered for a play signal and, when such a signal is found, erases said play signal, causes the corresponding selection to be played, and transmits to the remote selectors a signal representing the selection identification number of the selection being played, or, if no play signal is found in the memory, stops the search. In its selective mode operation, the search unit, in response to a signal from a remote selector representing the selection identification number of a user's selection choice, stores a play signal in the corresponding memory location and restarts the normal mode search cycle.

19 Claims, 6 Drawing Figures

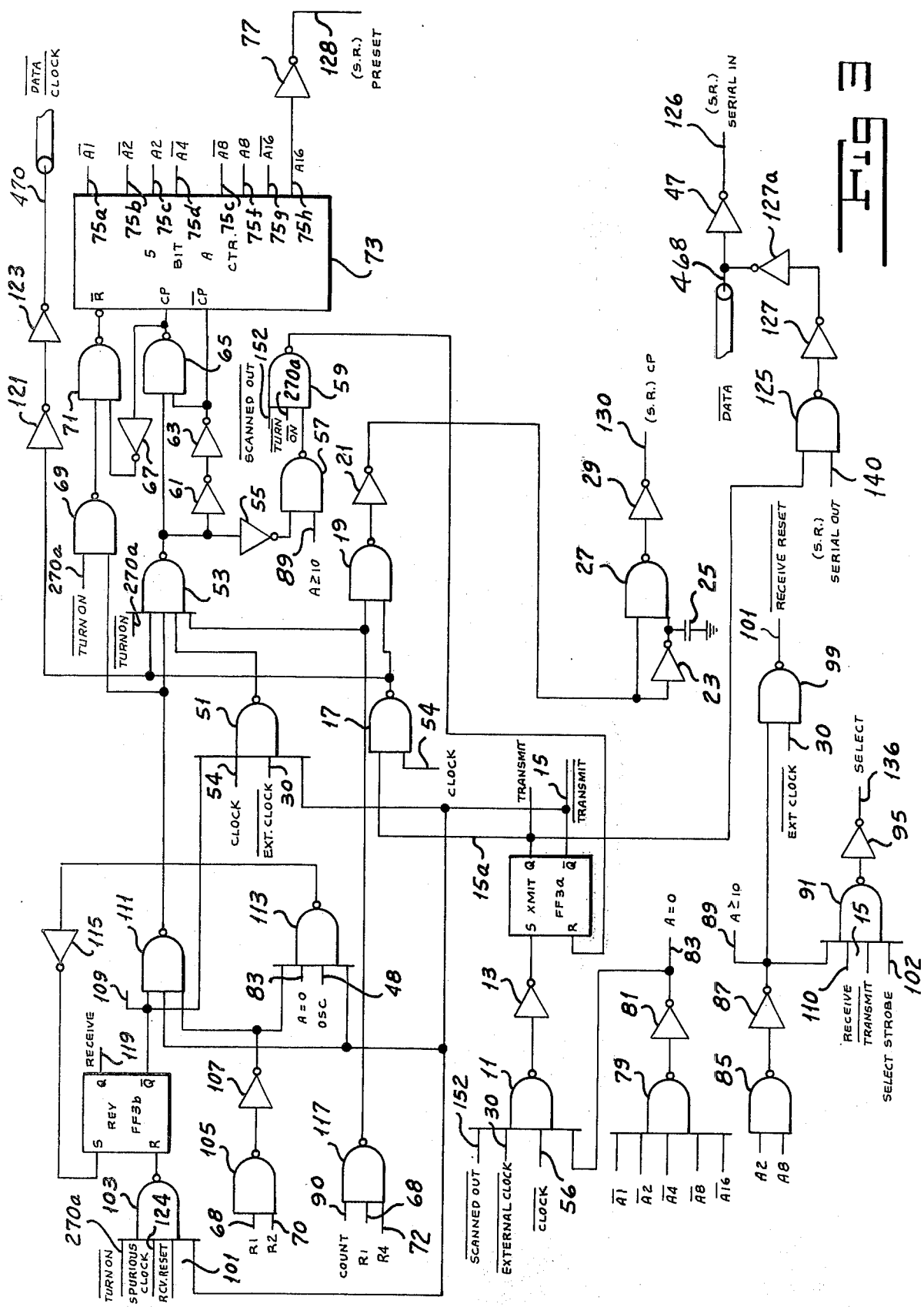

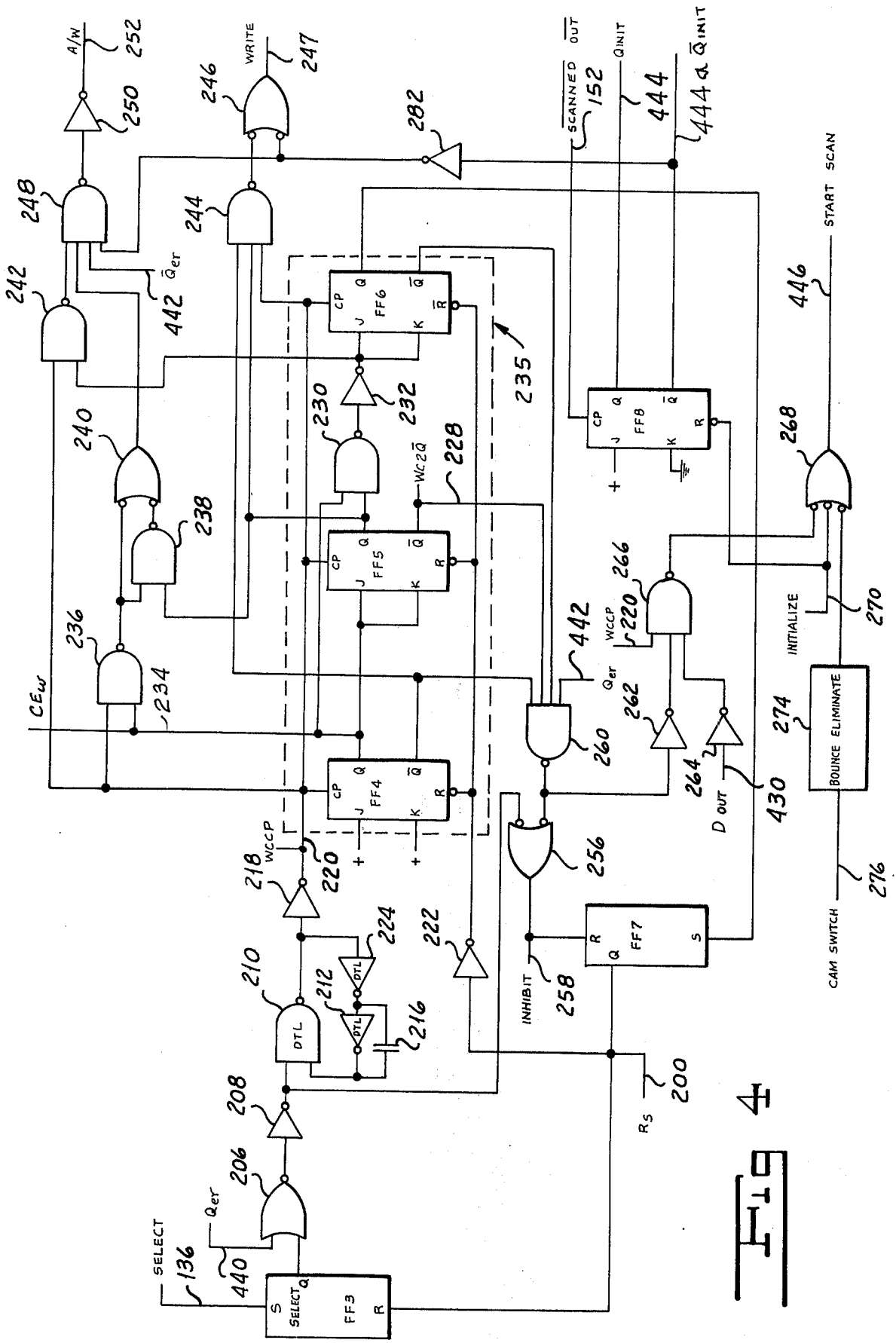

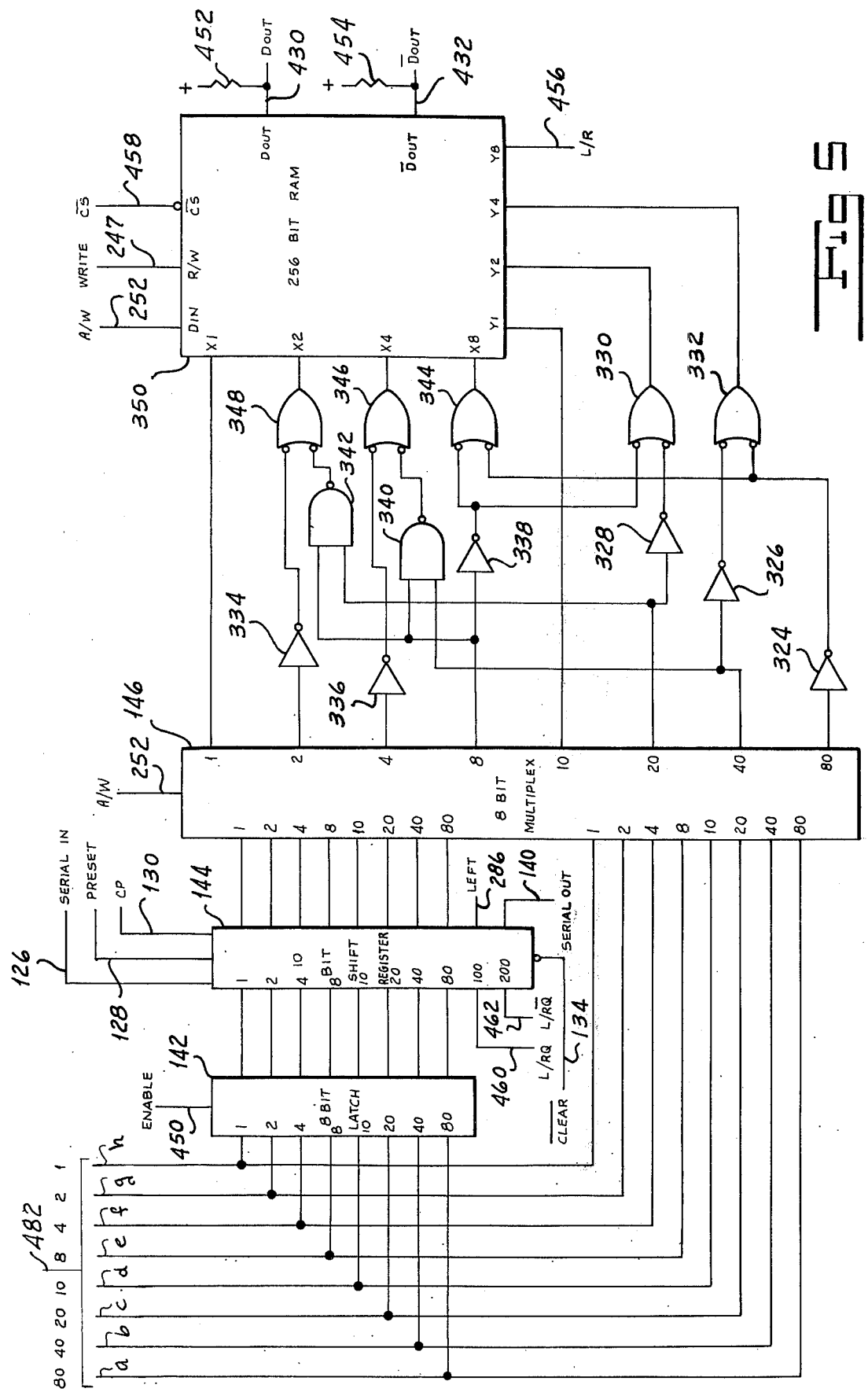

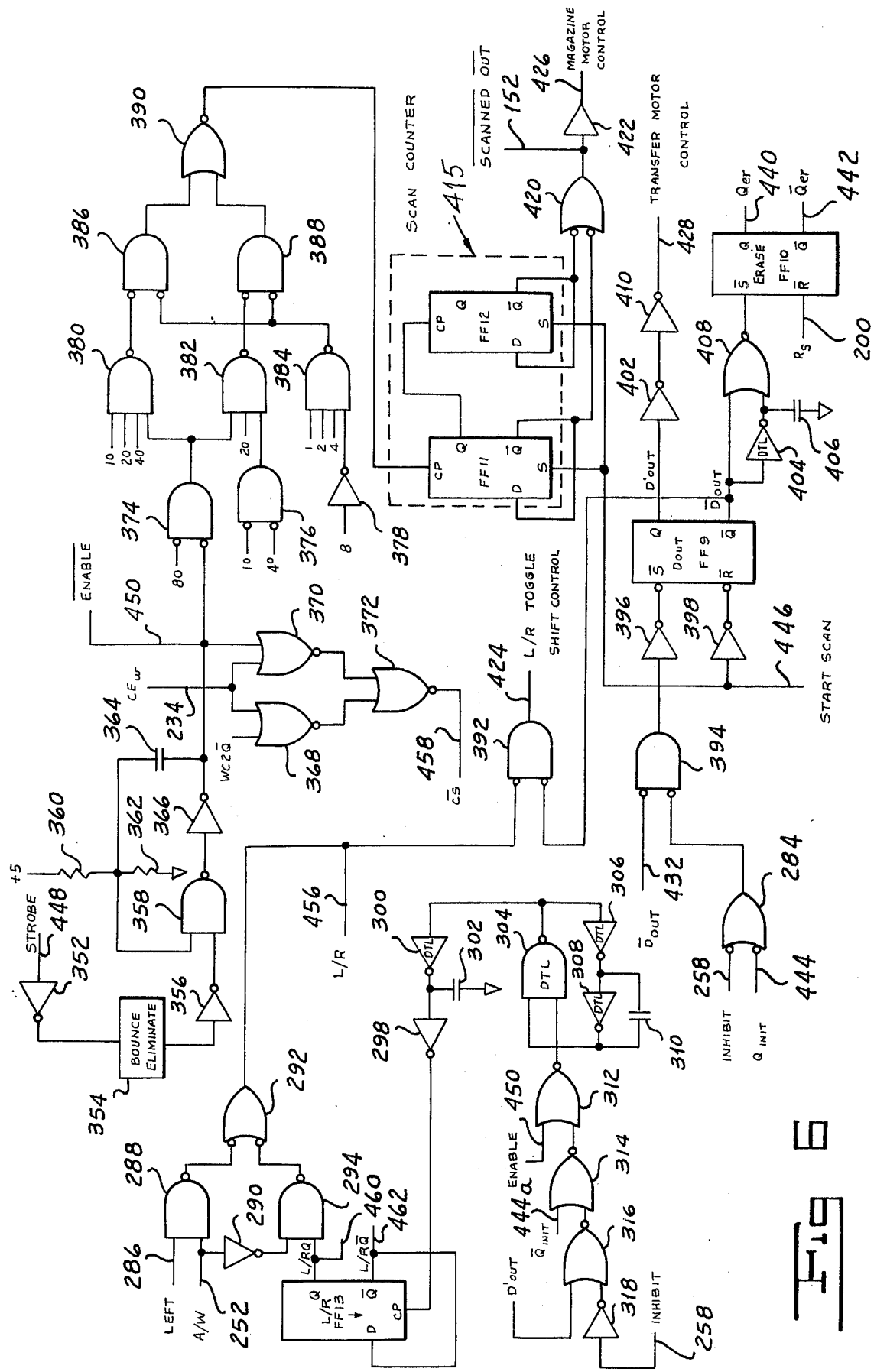

SOLID STATE SEARCH UNIT FOR AUTOMATIC PHONOGRAPH

BACKGROUND OF THE INVENTION

There have recently been developed a number of automatic phonograph selection systems in which many of the electromechanical switching and storage elements heretofore used have been replaced by solid state logic circuits. In one such system, shown in Jachimek et al. U.S. Pat. No. 3,701,970, signals representing respective digits of a selection identification number are loaded into a first buffer register located in a remote selector in response to user actuation of a bank of selection switches. When all of the digits have been loaded and error checked, the data in the first buffer register is entered in the memory of a second buffer register located in a central unit.

While the Jachimek et al. patent discloses several improvements over systems of the prior art, the patentees do not provide any means for displaying the number of the record being played at the selector. Such means is desirable in the frequently occurring situation where a potential customer cannot associate the sound of the selection played with its number. Moreover, the Jachimek et al. apparatus requires four lines to link each selector with the central unit, thus not entirely eliminating the multiplicity of connecting lines the patentees seek to avoid.

SUMMARY OF THE INVENTION

One object of my invention is to provide a search unit for an automatic phonograph which overcomes the defects of search units of the prior art.

Another object of my invention is to provide a search unit for an automatic phonograph which transmits to remote selectors a signal representing the record being played.

Still another object of my invention is to provide a search unit for an automatic phonograph which does not require a multiplicity of transmission lines.

Other and further objects will appear from the following description.

In general, my invention contemplates the provision of a solid state search unit to be used in an automatic phonograph system having a record magazine and playing mechanism and a plurality of user-actuated selectors. In this system, phonograph selections are identified by three-digit selection identification numbers, of which the first digit represents the side of the record being played, and the second and third digits represent the position of the record in the magazine. The remote selectors are described at length in the copending application of William C. Brotz, Ser. No. 464,757, filed Apr. 26, 1974 now U.S. Pat. No. 3,891,970. In the selector units, respective digits of the number of the selection chosen are visually displayed as soon as they are generated in response to user actuation, and are continued to be displayed for a predetermined period following the transmission of a binary encoded signal representing the number to the central unit. Whenever users are not making selections, the selector units, in response to the transmission from the central unit of a signal representing the number of the selection being played, display such number.

My invention relates to the search unit portion of the central unit used in the above system to perform the appropriate storage, search, and control functions. Included in the search unit is a solid state addressable memory, binary locations of which correspond to the selections offered. These locations normally contain 0's, but may be loaded with a 1, or "play" signal, to indicate that the corresponding selection is to be played. In its normal mode of operation, the search unit, in cyclical fashion, searches the memory for a play signal and then, when such a signal is found, erases it and transmits a signal to the record magazine causing the corresponding selection to be played. While in its normal mode, the search unit also transmits to the selectors a signal representing the selection identification number of the selection being played, there to be used for display purposes. If no play signal is found, the search unit will end the search. In response to the transmission from a remote selector of a signal representing the selection identification number of the user's selection choice, the search unit enters a momentary selective mode, in which a play signal is loaded into the corresponding memory location. When the normal mode is reentered, the search-play cycle continues, or is restarted if it has stopped because no play signal was found.

BRIEF DESCRIPTION OF THE DRAWINGS

In the accompanying drawings which form part of the instant specification and which are to be read in conjunction therewith and in which like reference numerals are used to indicate the parts in the various views:

FIG. 3 is a schematic view of the transmit-receive control portions of the search unit.

FIG. 4 is a schematic view of the write control portion of the search unit.

FIG. 5 is a schematic view of the various data storage components of the search unit.

FIG. 6 is a schematic view of the magazine motor control, transfer motor control, toggle shift control, and strobe pulse shaping portions of the search unit.

DESCRIPTION OF THE PREFERRED EMBODIMENT

Figure 1:
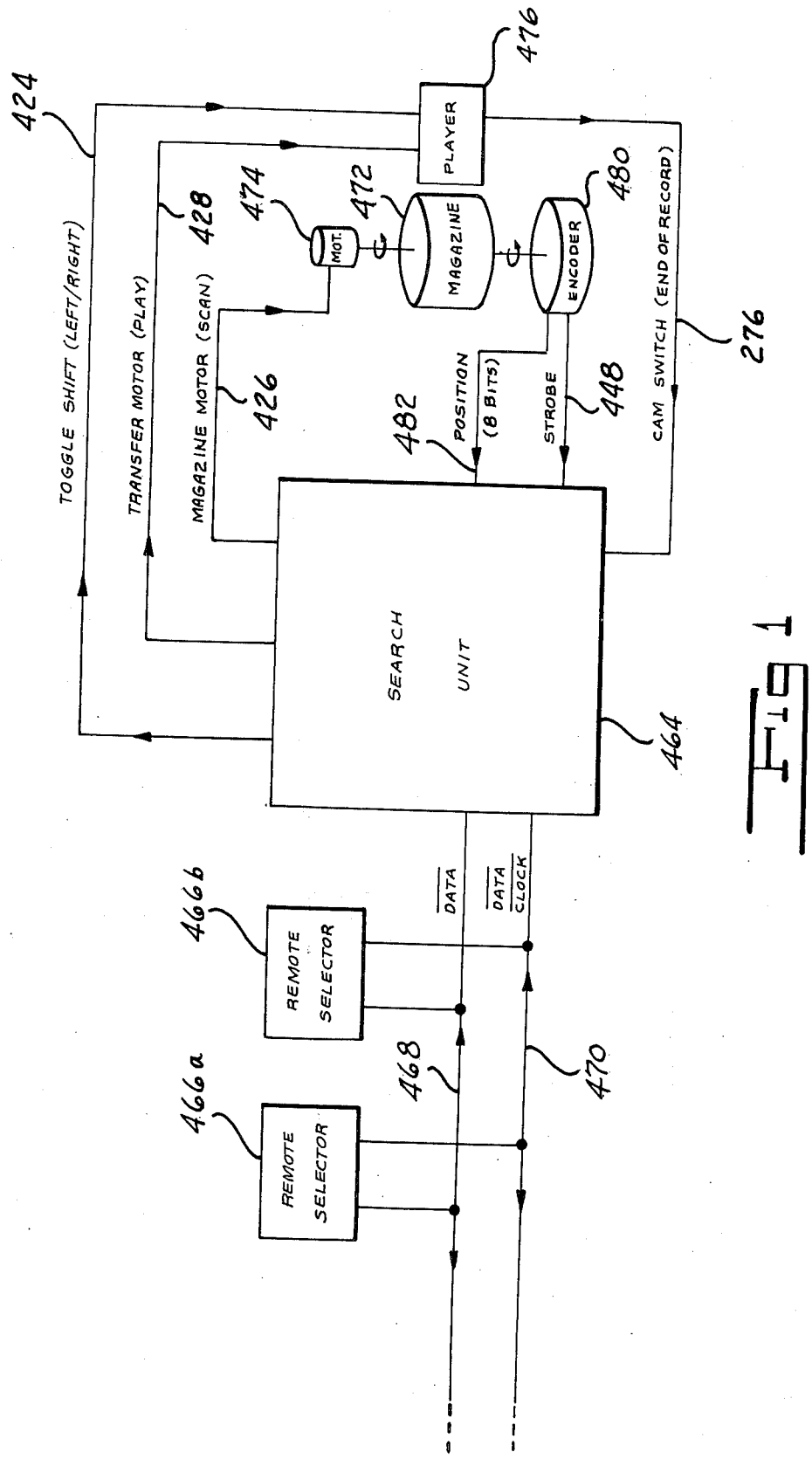
FIG. 1 is a block diagram of the phonograph system in which the search unit is to be used, showing the search unit, the record magazine, and the remote selectors.

FIG. 1 is a block diagram of the phonograph system in which the search unit is to be used. The search unit, indicated generally by the reference character 464, and as will be explained in detail hereinbelow, contains a 200-bit memory whose locations correspond to the selections offered. In the preferred embodiment, selections are numbered from 100 to 299, the first digit representing the side of the record, the second and third digits representing the position of the record in the magazine. The search unit 464 is connected to a plurality of remote selector units, of which two, selectors 466a and 466b, are shown, by a "$\overline{\text{data}}$" line 468 and a "$\overline{\text{data clock}}$" line 470. The selectors used herein are described at length in the copending application of William C. Brotz, Ser. No. 464,575, filed Apr. 26, 1974, now U.S. Pat. No. 3,891,970. Selection identification numbers are transmitted to and from the search unit 464 in the form of a 10-bit pulse train on $\overline{\text{data}}$ line 468, of which pulse train the first two bits represent the first digit, the third through sixth bits represent the second digit, and the seventh through tenth bits represent the third digit. A train of ten synchronizing pulses is simultaneously transmitted in the same direction on data clock line 470. In the normal mode operation of the search unit 464, signal trains representing the record being played are periodically transmitted to the selectors 466a and 466b, where they are used to light a digital display of the selection identification number. When a customer actuates a selector in making a selection, the selector waits until a break occurs between the "record being played" pulse trains and then transmits a single 10-bit pulse train representing the selection choice to the search unit. Upon receiving such a pulse train, the search unit 464 interrupts its normal mode operation and enters a selective mode in which it inhibits transmitting and stores a play signal in its internal memory at a location corresponding to the number received.

The search unit 464 is also coupled to the record playing mechanism, the main components of which are a record magazine 472 which rotates on an axis in response to energization of a motor 474 and the player assembly 476. The magazine 472 may in this particular embodiment contain up to 100 records. Different records are brought into position for play upon energization of motor 474 to change the orientation of the magazine with respect to the player assembly 476. The motor 474 is energized in response to a "magazine motor" signal on a line 426 originating at the search unit 464. Also coupled to the magazine is an encoding wheel 480, which provides an output to the search unit consisting of an 8-bit binary coded representation of the magazine number of the record in position for play. This signal is carried on eight lines indicated collectively as a channel 482. In addition, a "strobe" signal is generated on line 448 by the encoding wheel in the center of each position segment. This signal, also conveyed to the search unit 464, strobes the 8-bit position signals at the proper time.

Search unit 464 provides the player assembly 16 with "transfer motor" and "toggle shift" signals on lines 428 and 424, respectively. When a signal appears on line 428, the playing assembly stops the magazine 472 and plays either the left side or the side of the record then in position, in accordance with the polarity of the signal on line 424. At the end of a record, a signal is transmitted to the search unit on a "cam switch" line 276.

In its normal mode operation, the search unit 464 alternates between scanning and playing. The search unit scans by providing a signal on line 426 only, thereby rotating the record magazine 472, and reading, sequentially, the memory locations (both right side and left side) corresponding to the position signal on lines 482. When a play signal, or signal corresponding to a selected recording is found, the search unit 464 generates a signal on line 424 indicating that side of the record for which the play signal was found. At the same time a signal on line 428 stops the magazine and causes the selected recording to be played. When the selection is over and the search unit receives a signal on line 276, the transfer motor signal is reset, allowing scanning to resume. The signal on line 426 is itself reset if the entire magazine 472 has been scanned without finding a play signal.

Figure 2:
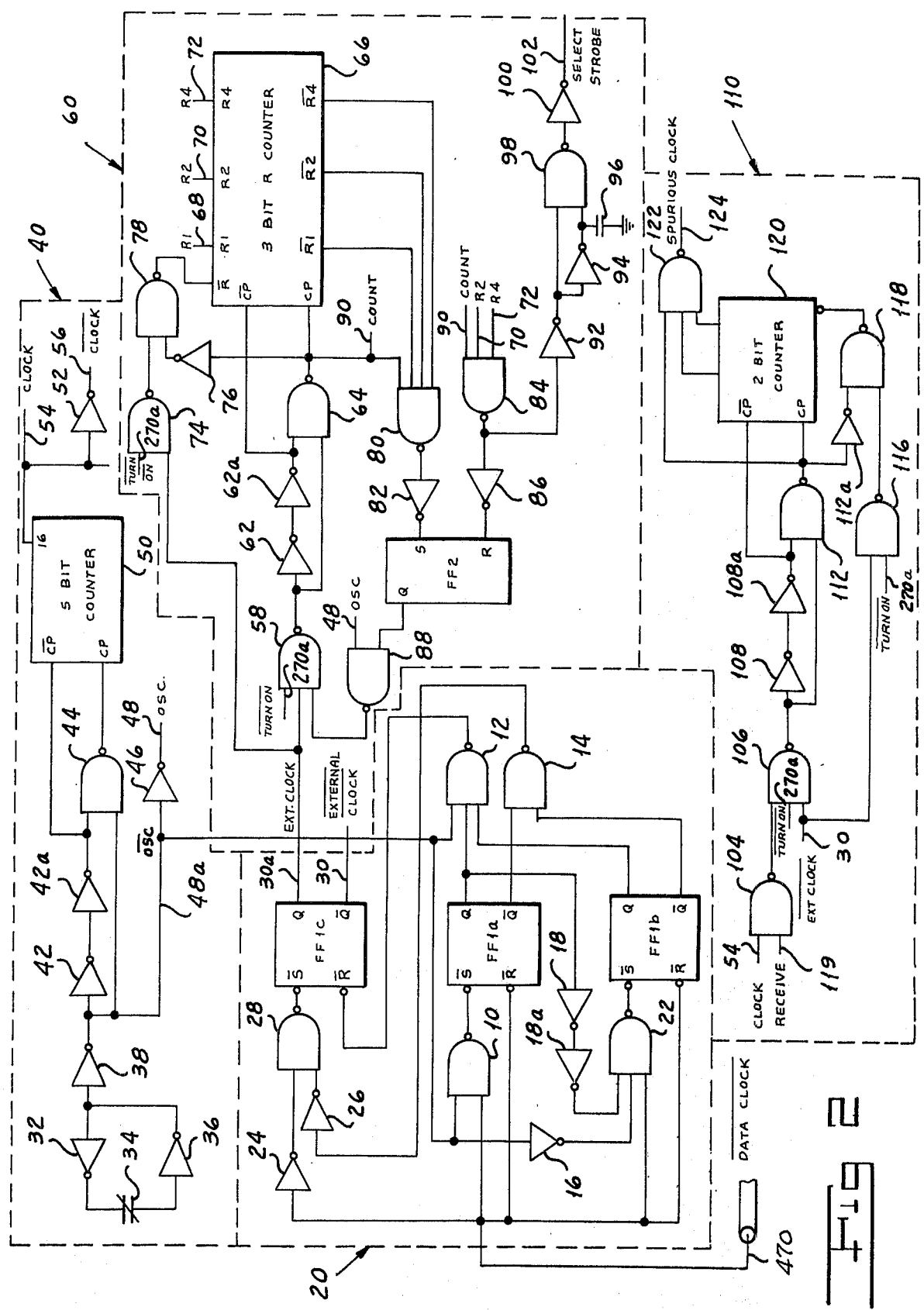
FIG. 2 is a schematic view of the oscillator and input portions of the search unit.

Referring now to FIG. 2, the oscillator section of the search unit 464, indicated generally by the reference numeral 40, includes an inverter 32 which drives a variable capacitor 34, which in turn drives an inverter 36, the output of which drives the input to inverter 32.

The output of an inverter 38 driven by inverter 36 appears as an "oscillator" signal on line 48. In addition, the output of inverter 38 provides one input to a NAND circuit 44 and the input to an inverter 42. Inverter 42 drives inverter 42a, which in turn provides the other input to NAND circuit 44. NAND circuit 44 supplies the clock pulse, or CP input to a five $\overline{\text{bit}}$ counter 50, here used as a frequency divider. A $\overline{\text{CP}}$ terminal to counter 50 is provided with the complement signal derived from the output of inverter 42a. The 16's place output of counter 50 appears on "clock" line 54, and is inverted by an inverter 52 to provide a signal on a $\overline{\text{clock}}$ line 56. In the preferred embodiment, the clock signal has a frequency of approximately one Khz.

Referring now to the noise filter section of the receiver portion of the unit 464, indicated generally by the reference numeral 20, the $\overline{\text{data clock}}$ line 470, originating at the remote selectors, drives one input to a NAND circuit 10, the other input to which is provided by the $\overline{\text{oscillator}}$ signal on line 48a. In addition, line 122 drives the $\overline{\text{R}}$ or (inverted) reset terminals of RS-type flip-flops FF1a and FF1b. NAND circuit 10 drives the $\overline{\text{S}}$ or (inverted) set input to flip-flop FF1a. The Q or normal output of flip-flop FF1a is fed to one input of a NAND circuit 12, the other two inputs of which are provided by the $\overline{\text{oscillator}}$ signal and the Q output of flip-flop FF1b, respectively. The respective $\overline{\text{Q}}$ or inverted outputs of flip-flops FF1a and FF1b drive the two inputs to a NAND circuit 14. The Q output of flip-flop FF1a is also passed through inverters 18 and 18a to provide one input to NAND circuit 22, the second and third inputs to which are provided by an inverter 16 connected to the $\overline{\text{oscillator}}$ line and by the data clock signal, respectively. NAND circuit 22 drives the $\overline{\text{S}}$ input to flip-flop FF1b. NAND circuit 14 drives an inverter 26, while NAND circuit 12 drives the $\overline{\text{R}}$ input to a third RS-type flip-flop FF1c. The $\overline{\text{S}}$ input to FF1c is provided by a NAND circuit 28 driven by inverter 26 and by an inverter 24 driven by the $\overline{\text{data clock}}$ line 470. The Q and $\overline{\text{Q}}$ outputs of flip-flop FF1c provide signals on "external clock" line 30a and $\overline{\text{external clock}}$ line 30, respectively.

Referring to the strobe pulse circuit, indicated generally by the reference character 60, a NAND circuit 58, responsive to the external clock line 30a, the output of a NAND circuit 88, and a "turn on" line 270a on which a 0 pulse is generated when the search unit is turned on, drives an inverter 62 and one input to a NAND circuit 64. Inverter 62 is coupled to inverter 62a, which drives the other input to NAND circuit 64. NAND circuit 64 provides the CP input of a three bit "R" counter 66 and the signal for a "count" line 90. The $\overline{\text{CP}}$ input to the counter 66 is driven by the complement signal derived from the output of inverter 62a. R counter 66 has respective 1's, 2's, and 4's place outputs R1, R2, and R4, and their complements $\overline{\text{R1}}$, $\overline{\text{R2}}$, and $\overline{\text{R4}}$. The $\overline{\text{R}}$ or (inverted) reset input to the counter is provided by a NAND circuit 78 driven by an inverter 76, fed by NAND circuit 64, and by a NAND circuit 74 responsive to the external clock signal and to the $\overline{\text{turn on}}$ signal. Counter outputs R1, R2, and R4 appear on lines 68, 70, and 72, respectively. Counter outputs $\overline{\text{R1}}$, $\overline{\text{R2}}$, and $\overline{\text{R4}}$ provide three inputs to a NAND circuit 80, the fourth input to which is provided by the count line 90. NAND circuit 80 drives an inverter 82 coupled to the S or set input of an RS flip-flop FF2. The R or reset input of FF2 is provided by an inverter 86 fed by a NAND circuit 84 which, in turn, is coupled to the R2, R4, and count lines 70, 72, and 90. NAND circuit 84 also drives an inverter 92 driving another inverter 94 and one input to a NAND circuit 98. I connect the output of inverter 94 to ground through a capacitor 96, and to the other input to NAND circuit 98. The output of NAND circuit 98 is passed through an inverter 100 to drive a "select strobe" line 102.

Referring now to the spurious clock circuit, indicated generally by the reference numeral 110, a NAND circuit 104, responsive to the clock signal on a line 54 and to a "receive" signal on a line 119, feeds one input to a NAND circuit 106 which obtains its other inputs from the external clock line 30 and the turn on line, respectively. NAND circuit 106 provides one input to a NAND circuit 112 directly, and the other input to circuit 112 through inverters 108 and 108a. Respective complement signals to the CP and $\overline{CP}$ inputs of a two-bit counter 120 are provided by NAND circuit 112 and by inverter 108a, respectively. The $\overline{R}$ input to the counter 120 is provided by a NAND circuit 118, which is responsive to an inverter 112a coupled to NAND circuit 112, and to a NAND circuit 116, responsive to the external clock line 30 and the turn on line, respectively. A NAND circuit 122 responsive to both output places of counter 120 and to the CP output of NAND circuit 112 is adapted to produce a "spurious clock" signal on a line 124.

From the structure thus far described, it will be seen that the incoming data clock signal on line 470 first passes through the noise filter circuit, indicated generally by the reference character 20. When line 470 is energized (i.e. at logic 0), flip-flops FF1a and FF1b are reset, while flip-flop FF1c is set by 1's appearing at both inputs to NAND circuit 28. As a result, a 1 appears on external clock line 30a. When line 470 again becomes quiescent, line 30a will return to 0 on the second positive oscillator pulse on line 48a, providing line 470 remains quiescent up to that time. Thus, on the first oscillator pulse, NAND circuit 10 will produce a 0, setting FF1a. When line 48a thereafter returns to 0, all of the inputs to NAND circuit 22 will become positive and flip-flop FF1b will be set. Finally, when line 48a next goes positive, all of the inputs to NAND circuit 12 will become positive, and flip-flop FF1c will be reset, thereby producing a 0 on external clock line 30a. It will be seen that the noise filter circuit 20 thus removes any negative transients from the external clock line 30 and any positive transients from the external clock line 39a, which might otherwise deleteriously affect the system's operation.

When line 30a is quiescent in its 0 state, the R counter 66 is held at reset, the flip-flop FF2 is also reset. When line 30a becomes energized, the reset signal is removed from the $\overline{R}$ terminal and line 90 becomes positive. Because all of the inputs to NAND circuit 80 are now positive, flip-flop FF2 is set. When FF2 sets, the oscillator signal on line 48 is allowed to appear at the output of NAND circuit 88 (inverted) and thus at the CP input to counter 66, thereby clocking it. When the R counter 66 reaches six, the concurrence of signals on the count, R2, and R4 lines produces a 0 at the output of NAND circuit 84, causing FF2 to reset, at which time the oscillator signal is inhibited from the input of NAND circuit 88 and the counter 66 stops counting. The 0 at the output of NAND circuit 84 also results in a momentary positive pulse on the select strobe line 102. Immediately preceding the sixth count, the upper input to NAND circuit 98 is at 0 while the lower input is at 1. When, on the sixth count, NAND circuit 84 changes to 0, the lower input to circuit 98 remains at 1 for a brief period after the upper input changes to 1. As a result, a pulse is generated by NAND circuit 98, which pulse, inverted, appears on line 102. Finally, when the external clock signal is removed, 1's appearing at both inputs to NAND circuit 78 cause the counter 66 to reset, returning the circuit to its quiescent state. The R1, R2, R4, count, and select strobe signals generated by the strobe pulse circuit 60 are used by the transmit-receive control portion, shown in FIG. 3, in a manner to be described.

The spurious clock circuit, indicated generally by the reference numeral 110, discriminates between genuine and spurious pulses appearing on the $\overline{\text{data clock}}$ line 470 (and thereby appearing on the external clock line 30) and resets the transmit-receive control portion in the event of a spurious pulse on the $\overline{\text{data clock}}$ line. When the transmit-receive control portion is actuated by an external signal, line 119 goes positive and the two-bit counter 120 is clocked by the clock signal on line 54 so long as the external clock line 30 remains at its quiescent state of 1.

When the external clock line is energized in response to a signal on $\overline{\text{data clock}}$ line 470, the counter 120 is reset and counting is inhibited. A spurious clock signal will be generated on line 124 if the external clock line 30 remains quiescent for three clock pulses or longer, thus allowing the counter 66 to count to three. Thus the transmit-receive control portion is reset by this circuit if it was erroneously set in response to an isolated pulse on line 470, as distinguished from a genuine data clock pulse forming part of a ten-pulse train.

Referring now to FIG. 3, in the transmit portion of the search unit, a NAND circuit 11, responsive to a "scanned out" line, the external clock line, the clock line 56, and to an "A=0" line 83, drives an inverter 13 which in turn controls the S, or set input to "transmit" flip-flop FF3a. The Q and $\overline{Q}$ outputs of the transmit flip-flop FF3a appear on transmit line 15a and transmit line 15, respectively. A NAND circuit 17 responsive to the transmit signal on line 15a and to the clock signal on line 54 drives an inverter 121 coupled to the data clock line 470 through an inverter 123.

NAND circuit 17 provides one input to a NAND circuit 19, the other input to which is provided by a NAND circuit 117 responsive to the R1, R4 and count signals on lines 68, 72 and 90. An inverter 21 couples the output of circuit 19 to one input to a NAND circuit 27 and to an inverter 23 which provides the other input to circuit 27. A capacitor 25 connects the output of inverter 23 to ground. An inverter 29 couples the output of circuit 27 to a line 130 to actuate a shift register to be described hereinbelow.

In addition to the foregoing, NAND circuit 17 provides one input to a NAND circuit 53. NAND circuit 117 provides a second input to circuit 53. The turn on line 270a provides a third input to circuit 53, while respective NAND circuits 51 and 111 provide fourth and fifth inputs to circuit 53.

NAND circuit 111 also drives one input to a NAND circuit 69, the other input to which is provided by the turn on line 270a. NAND circuit 53 drives one input to a NAND circuit 65 directly and another through inverters 61 and 63. Inverter 63 also drives the $\overline{CP}$ input to a five bit "A" counter 73. NAND circuit 65 drives the CP input to counter 73 and an inverter 67. Circuits 67 and 69 each provide one input to NAND circuit 71, the output of which is coupled to the $\overline{R}$ or (inverted) reset terminal to counter 73. An inverter 55 responsive to the output of NAND circuit 53 drives one input to NAND circuit 57, the other input to which is provided by an "A ≥ 10" line 89. I connect the output of a NAND circuit 59, responsive to a NAND circuit 57, the $\overline{\text{turn on}}$ line 270a, and the $\overline{\text{scanned out}}$ line, to the reset terminal of flip-flop FF3a. Respective complement 1's through 16's place outputs from A counter 73 are provided by $\overline{A1}$ line 75a, $\overline{A2}$ line 75b, $\overline{A4}$ line 75d, $\overline{A8}$ line 75e, and $\overline{A16}$ line 75g, while respective 2's, 8's, and 16's place outputs are provided by A2 line 75c, A8 line 75f, and A16 line 75h. An inverter 77 responsive to the A16 line is coupled to a "preset" line 128, connected to the preset terminal of a shift register, to be described. A NAND circuit 79, responsive to the A counter complement outputs $\overline{A1}$ through $\overline{A16}$, is coupled to an inverter 81 which provides an "a=0" signal on line 83 whenever the A counter 73 is clear. A NAND circuit 125, responsive to the transmit signal and to a "serial out" signal on a line 140 originating to a point to be described, is coupled to the $\overline{\text{data}}$ line 120 through a pair of inverters 127 and 127a.

Referring now to the receive portion of the transmit-receive control portion of the search unit, shown in FIG. 3. I couple the reset terminal of a "receive" flip-flop FF3b to a NAND circuit 103 responsive to the $\overline{\text{turn on}}$ line 270a, the spurious clock line 124, a "receive reset" line 101, and the $\overline{\text{transmit}}$ line 15. The S input to flip-flop FF3a is coupled through an inverter 115 from a NAND circuit 113, which in turn is responsive to the transmit line 15, an A=0 line 83, the oscillator line 48, and an inverter 107. Inverter 107 is responsive to the output of a NAND circuit 105 responsive to R1 and R2 on lines 68 and 70, respectively. The Q output of flip-flop FF3 appears on receive line 119, while the $\overline{Q}$ output appears on line 109 and is fed to a NAND circuit 111, NAND circuit 111 is also responsive to the $\overline{\text{transmit}}$ signal on line 15 and to the output of inverter 107. NAND circuit 85, responsive to the A2 and A8 lines, provides an output on the "A=10" line 89 and respective inputs to NAND circuits 91 and 99. Line 89 carries a 1 whenever the A count, considering only the four least significant bits, is 10, 11, 14, or 15. NAND circuit 91, also responsive to the receive line 119, transmit line 15, and select strobe line 102, drives a "select" line 136 through an inverter 95. The select line is used to provide a signal to the write control circuit indicating that a selection signal has arrived from a remote selector. NAND circuit 99, responsive to the output of an inverter 87 and to the external clock signal on line 30, provides a receive reset signal on a line 101. Data line 470, which carries selection information originating from the selectors, is coupled through inverter 47 to the serial in line 126 coupled to the serial input line of a shift register to be described.

In the normal mode of operation, the A counter 73 is used to turn on the transmit flip-flop FF3a for a period of ten clock pulses every 32 clock pulses. The Q output of flip-flop FF3a provides the basic control signal for the transmission of data to the selectors. Assuming that the count is currently above ten and that flip-flop FF3a is therefore turned off, external clock line 30 will be at logic 1. During the entire normal mode of operation, the $\overline{Q}$ output of the receive flip-flop FF3b will also be at 1. As a result, NAND circuit 51 will reproduce, in inverted form, the clock signal on line 54. Since all of the other inputs to NAND circuit 53 are currently 1, the uninverted clock signal will appear at the output of that NAND circuit, where it will clock the A counter 73 on its lagging edges. When the counter 73 counts through to zero, after having reached 31, 1's on the $\overline{A1}$, $\overline{A2}$, $\overline{A4}$, $\overline{A8}$, and $\overline{A16}$ lines will cause a 1 to be generated by inverter 81 on A= 0 line 83. Since both the $\overline{\text{scanned out}}$ and external clock lines are assumed to be at 1, and the counter 73 counts when clock is 1, the output of NAND circuit 11 will go to 0 and the transmit flip-flop FF3a will be set. When this occurs, line 15 goes to 0 and NAND circuit 51 will no longer transmit the clock signal to the counter 73. While the transmit flip-flop FF3a is on, the clock signal is applied to NAND circuit 53 and to the A counter 73 through NAND circuit 17. When the count reaches ten, 1's on the A2 and A8 lines will cause a 1 to be generated by inverter 87 on A ≥ 10 line 89. The concurrence of this latter signal and the 0 at the output of NAND circuit 53 triggering the count will produce a 0 at the output of NAND circuit 57 to reset the transmit flip-flop FF3a, allowing the cycle to begin anew, and counter 73 being clocked through NAND circuit 53 as before.

The 10-pulse train produced at the output of NAND circuit 17 by gating the clock signal with the Q output of the transmit flip-flop FF3a is transmitted through inverters 121 and 123 to the $\overline{\text{data clock}}$ line 470, which line runs to the selectors. The output of NAND circuit 17 is also applied, through NAND circuit 19 and inverter 21, to a one-shot circuit consisting of components 23, 25, 27 and 29. Normally, inverter 29 produces a 0. However, when the output of inverter 21 changes from 0 to 1, as it does on the lagging edge of each pulse of the pulse train sent out on line 470, the lower input to NAND circuit 27 remains at 1 for a brief period after the upper input changes to 1, resulting in a positive pulse on line 130. These latter pulses shift the data representing the record being played out of a shift register to be described onto a serial out line 140. A NAND circuit 125, responsive to the transmit signal and to the record being played pulse data, gates the information to onverters 127 and 127a which pass the data to line 468, on which line the data is transmitted to the selectors. The shift register to be described from whence the record being played ata comes, is reloaded with data each time the transmit flip-flop is set when a 0 signal on the A16 line produces a 1 on the preset line 128.

When a memory to be described hereinbelow indicates that no more records remain to be played, a scanned out signal on a line 152 changes to 0, thereby producing a 1 from NAND circuit 59 to reset the transmit flip-flop FF3a, if it is then set. In addition, the output of NAND circuit 11 will be held at 1, preventing the flip-flop FF3a from being set. As a result, no signals are transmitted from the search unit either on line 468 or on line 470 while the search unit is scanned out.

The normal mode operation is interrupted whenever a signal is transmitted from one of the selectors. The selectors are designed to transmit only during quiescent periods during which the transmit flip-flop FF3a is turned off. Thus, when the transmit flip-flop FF3a is on, the $\overline{\text{transmit}}$ signal on line 15 holds NAND circuit 113 at 1, preventing the receive flip-flop FF3b from being erroneously set in response to the data clock signal train transmitted from the search unit. When a signal is transmitted from a selector over lines 468 and 470, an external clock pulse train is generated on line 30a in the manner described earlier and each of the train pulses in turn activates the R counter circuit 66, shown in FIG. 1B. When the R counter 66 counts to three on the first external clock pulse, R1 and R2 lines both become positive, producing a 1 at the output of inverter 107. This in turn produces a 1 at the output of NAND circuit 11, which signal is applied to NAND circuits 53 and 69 to reset the A counter 73. When, immediately thereafter, the oscillator line 48 next goes positive, all of the inputs to NAND circuit 113 become positive, setting the receive flip-flop FF3b. When, on the first and each succeeding external clock pulse, the R counter 66 counts to five, count line 90, R1 line 68, and R2 line 72 all become positive, producing a 0 at the output of NAND circuit 117. This output is applied to NAND circuit 53 to clock the A counter and, in addition, is applied through NAND circuit 19 and inverter 21 to the oneshot circuit described hereinabove which provides pulses on line 130. Incoming data appearing on line 468 is inverted by inverter 47 and then applied to line 126. When the A counter 73 reaches ten and the R counter 66 (FIG. 2) reaches six, generating a select strobe signal on line 102, all of the inputs to NAND circuit 91 become positive and a select signal is generated on line 136. This latter signal causes a 1 play signal to be loaded into a memory location corresponding to the number stored in a shift register in a manner to be described. When, after the tenth A count, the external clock line 30 returns to its quiescent level of 1, a 0 will be generated on receive reset line 101, generating a 1 at the output of NAND circuit 103 and thereby resetting the receive flip-flop FF3b. When this occurs, the search unit returns to its normal mode, with the A counter now being clocked through NAND circuit 51 in the manner previously described.

Referring now to FIG. 5, the data storage components of the search unit include an 8-bit latch 142 which stores a two-digit number representing the position of a selection in the record magazine. An encoder 480 of any suitable type from the art (not shown) translates the most significant digit into binary coded decimal data on lines a to d of channel 482 and data representing the least significant digit on lines e to h of channel 482. Thus, the position address represented by the decimal number 44 would generate 1's on the b and f lines and 0's on the remaining data lines. Data lines a to h are connected to the 80's place through 1's place inputs of the latch 142, respectively, and are also connected to one set of 80's place to 1's place inputs of an 8-bit multiplex 146. Latch 142 is enabled by an "enable" pulse on line 450 which is generated in the middle of an encoding wheel segment. Address information thus remains stored in the latch 142 until an enable pulse "strobes" in new information.

The 80's place to 1's outputs of the latch 142 are coupled to the respective 80's place to 1's place inputs of a 10-bit shift register 144. 100's and 200's place inputs of the shift register 144 are provided by complementary signals "L/R Q" on line 460 and "L/R Q̄" on line 462, respectively. The 80's place to 1's place outputs of the shift register are connected to a second set of corresponding inputs, respectively, of the 8-bit multiplex 146. The 100's place output of the shift register 144 is coupled to a "left" line 286. A 1 appears on this line whenever bits 100 and 200 of selection data stored in the shift register indicate that the left side of a record contains the selection. Clock pulses applied to the register by CP line 130 pulse into the register 144 serial data appearing on serial in line 126, and pulse data out of the register onto serial out line 140. A 0 signal applied to clear line 134 clears the shift register.

The multiplex unit 146 is switched between the two sets of inputs by means of the A/W signal generated on line 252 in a manner to be described. A 0 signal on the A/W line 252 gates in the signals on data lines a to h of channel 482, while a 1 signal gates in the shift register outputs from register 144. Multiplex outputs are coupled by circuits 324 through 348 to a 256-bit random access memory 350 which, in the preferred embodiment, is an Intel 1101. The memory is organized as a 16×16 matrix and is addressed by means of signals applied to row inputs X1–X8 and to column inputs Y1–Y8. Thus, the location in the 5th row and the 10th column of the 16×16 matrix would be addressed by applying a 1 signal to inputs X4, X1, Y8, and Y2, and a 0 to the remaining address inputs.

Memory inputs X1 and Y1 are connected directly to 1's place 10's place multiplex outputs, respectively. Input X2 is driven by a NAND circuit 348 responsive to an inverter 334 and to a NAND circuit 342. Inverter 334 has its input connected to the 2's place miltiplex output; NAND circuit 342 receives inputs from the 8's place and the 20's place outputs of multiplex 146. Memory input X4 is driven by a NAND circuit 346 responsive to an inverter 336 and to a NAND circuit 340. Inverter 336 connects to the 4's place output of multiplex 146. NAND circuit 340 is driven by the 8's place and 40's place multiplex outputs. Input X8 is coupled to the output of a NAND circuit 344 responsive to inverters 338 and 324. Inventers 338 and 324 are driven by the 8's place and 80's place multiplex outputs, respectively. Memory input Y2 is driven by a NAND circuit 330 responsive to inverters 338 and 328. Inverter 328 has its input connected to the 20's place output of multiplex 146. Input Y4 is driven by a NAND circuit 332 responsive to signals from inverters 326 and 324. Inverter 326 is driven by the 40's place output of multiplex 146. Input Y8 of the memory is responsive to the "L/R" signal generated by the circuit shown in FIG. 6.

I connect the A/W line 252 to data input terminal "$D_{in}$" of the memory 350. The read/write, or R/W input of the memory 350 is connected to a line 247 on which I generate a write signal in a manner to be described. Respective normal and complement data outputs "$D_{out}$" and "$\overline{D}_{out}$" appear on lines 430 and 432, respectively. Outputs $D_{out}$ and $\overline{D}_{out}$ are connected to a source of positive potential by responective resistors 452 and 454. A "$\overline{CS}$", or inverted "chip select" signal which when 0 enables the memory 350 is provided by line 458.

The shift register 144 serves two functions. First, it accepts parallel data from the encoding wheel 480 through latch 142 and transforms the data into serial form to be transmitted to the selector units for display purposes. Second, it accepts serial data from the selector units and transforms it into parallel data used to address the appropriate location of memory 350.

When a selection is being played, the latch 142 stores a two-digit number representing the position of the record magazine. This information is fed to the 80-1 inputs of the shift register 144, and is also gated into the multiplex 146 by a 0 A/W signal. 200's place and 100's place inputs of the shift register are provided with complementary side-of-record signals L/R Q̄ and L/R Q, respectively. This composite signal comprising positional and side-of-record information is periodically loaded into and shifted out from the shift register 144 by means of the control signals generated by the transmit-receive control portion in the manner previously described. Positional and side-of-record data signals are also applied to the address inputs of the memory 350 through the multiplex 146 and the L/R line 456, respectively.

When a selection has finished and scanning is taking place, the positional and side-of-record signals applied to the memory address inputs cause the memory locations to be sequentially addressed in the search for 1 signals marking selections to be played. A 0 $\overline{CS}$ signal, generated in response to the enable signal on line 450 in a manner to be described, allows the locations sequentially addressed to be read. When a location containing such a signal has been reached, the scanning mechanism stops, and the record corresponding to that location is played. A write pulse generated by the write control counter of FIG. 4 in conjunction with a 0 $\overline{CS}$ signal causes a 0 to be entered into the memory location currently being addressed, thereby erasing the marking signal.

When a data signal arrives from a selector unit, the receiving section inverts the incoming signal and gates it onto line 126, and also generates shift pulses on line 130, thereby serially loading the data signal into the shift register 144 in the manner previously described. This information is then used to address the memory unit so that a 1 may be written into the memory location corresponding to the selection chosen. When the write control counter generates a 1 A/W pulse in the manner previously described, shift register outputs are gated by multiplex 146 into the memory interface circuits 324 to 348, where they are encoded into address input signals. At the same time, the 100's place shift register output is gated into memory input Y8 in a manner to be described. Therefore, when a 0 $\overline{CS}$ signal is generated on line 458 and a write signal is generated on line 247, a 1 is written into the appropriate memory location. When the A/W pulse has ended, positional and side-of-record information are again loaded into the shift register 144 and applied to the interface circuitry 324–348 as described above.

Referring now to FIG. 4, the write control circuit, active during the select, erase, and initialize cycles includes an R-S type "select" flip-flop FF3, which is set by the select signal generated on line 136, and which is reset by the Q output of a flip-flop FF7. The Q output of FF3, together with a "$Q_{erase}$" signal on line 440, are applied to NOR circuit 206, the output of which is inverted by inverter 208. The inverter 208 in turn drives a gated pulse generating circuit comprising components 210 and 218. A DTL logic NAND circuit 210, driven at one input by the inverter 208, drives inverter 218 and a DTL inverter 214. Inverter 214 has its output coupled to the input of a DTL inverter 212, and to one terminal of a capacitor 216 connected in parallel with the inverter 212. The output of inverter 212, together with the other input terminal of NAND circuit 210. The output of inverter 218 appears on a write control clock pulse or WCCP line 220. Whenever the output of inverter 208 is at a 0 level, NAND circuit 210 will be held at 1, resulting in a 0 or WCCP line 220. When, however, either the Q output of the select flip-flop FF3 or the $Q_{erase}$ signal are set at a 1 logic level, a 1 will appear at the output of inverter 208, enabling the pulse generating circuit and causing a pulse train to appear on line 220.

The pulse train thus generated clocks a 3-bit write control counter, indicated generally by the reference character 235, comprising J-K type flip-flops FF4, FF5 and FF6. Flip-flops FF4 to FF6 receive a common clock signal on line 220, and an inverted reset signal provided by inverter 222, which in turn is driven by the Q output of flip-flop FF7. Flip-flop FF4, representing the 1's place of the write control circuit, has both its J and K inputs connected to a source of positive potential so that it will change its state following each WCCP pulse. The Q output of FF4 appears on a "$CE_w$" (chip enable/write) line 234. Flip-flop FF5, representing the 2's place, has both its J and K inputs coupled to the Q output of flip-flop FF4 so that it will change its state following every other WCCP pulse. The $\overline{Q}$ output of FF5 appears on a "WC2$\overline{Q}$" line 228. Flip-flop FF6, representing the 4's place, has both its J and K inputs connected to the output of an inverter 232, the input to which is supplied by a NAND circuit 230 driven by the Q outputs of flip-flops FF4 and FF5. A WCCP pulse will cause flip-flop FF6 to change state whenever the Q outputs of flip-flops FF4 and FF5 are both positive, that is, every fourth WCCP pulse.

The outputs of the write control counter are converted into memory control signals by logic elements 236 to 250. The Q output of flip-flop FF4 and the WCCP signal on line 220 are applied to a NAND circuit 236, the output of which is coupled to one input of NAND circuit 238, and to one input of NAND circuit 240. NAND circuit 238 provides the other input to NAND circuit 240, while the Q output of FF5 is used to provide the second input to NAND circuit 238. NAND circuit 240 provides one input to a 4-input NAND circuit 248. NAND circuit 242, coupled to another input of NAND circuit 248, receives inputs from the WCCP line 220 and the output of inverter 232. Third and fourth inputs to circuit 248 are provided by a $\overline{Q}_{erase}$ signal on line 448 and by the output of inverter 282, respectively. NAND circuit 248 drives an inverter 250 which drives A/W (address/write) line 252. This last line is connected to the data input terminal of the memory 350 shown in FIG. 5, and is also used to provide a switching signal to the 8-bit multiplex 146. Assuming that the $\overline{Q}_{erase}$ signal and the output of inverter 282 both remain positive, clocking the write control counter will produce an A/W signal which begins on the leading edge of the second WCCP pulse and ends on the leading edge of the fourth WCCP pulse.

NAND circuit 244 receives inputs from the $\overline{Q}$ output of flip-flop FF4, the Q output of flip-flop FF5, and the WCCP line 220. The output of NAND circuit 244 is coupled to an input of NAND circuit 246, the other input of which is coupled to the output of inverter 282. NAND circuit 246 produces a "write" signal on line 247 which is conveyed to the read/write input to the memory 350. Clocking the write control counter will produce a write signal on line 247 which begins and ends with the third WCCP pulse. A continuous write signal is generated whenever a 0 appears at the output of inverter 282.

Reset flip-flop FF7, which provides a reset signal to the write control counter 235 and to various other circuits, is set by the Q output of flip-flop FF6, and is reset by an "inhibit" signal on line 258 generated by NAND circuit 256. NAND circuit 256 is in turn driven by inverter 208 and by NAND circuit 260. NAND circuit 260 receives input signals from the $\overline{Q}$ outputs of flip-flops FF4 to FF6 and from the $\overline{Q}_{erase}$ line 442. NAND circuit 260 also drives an inverter 262, which provides one input to a 3-input NAND circuit 266. Another input is provided by the WCCP clock on line 220. A third input to NAND circuit 266 is provided by an inverter 264, which derives its input through line 430 from the $D_{out}$ terminal of the memory 350 shown in FIG. 5.

Circuit 266 provides one input for another 3-input NAND circuit 268. Second and third inputs are provided, respectively, by an "initialize" signal on a line 270, and by a "cam switch" on line 276 which is first passed through a bounce eliminate circuit 274. NAND circuit 268 produces a "start scan" signal on line 446 used to set a counter, shown in FIG. 4, which controls the record scanning mechanism.

The signal on line 270 is also fed to the $\overline{R}$ or reset terminal of an "initialize" flip-flop FF8. This J-K type flip-flop assumes a 0 state during the initialize cycle, which takes place when the search unit is turned on. The J and K terminals are connected to a positive voltage source and to ground, respectively, so that the flip-flop FF8 will be set at the end of the first $\overline{\text{scanned out}}$ pulse on line 152, which is applied to the CP terminal of FF8. The Q output of this flip-flop, designated "$Q_{initialize}$," appears on line 444; the $\overline{Q}$ output of FF8, designated $\overline{Q}_{initialize}$, is applied to inverter 282 and to a line 444a.

The first cycle involving the write control counter is the initialize cycle. Normally, line 270 is at a 1 logic level, as are also the outputs of NAND circuit 266 and the bounce eliminate circuit 274. When the search unit is turned on a negative-going initialize pulse appears on line 270. This resets the initialize flip-flop FF8 and also produces a start scan signal on line 446, setting the scan counter, the operation of which is described below. While the scan counter is counting down, a 1 appears on a start scan line 446 and the memory 350 will be addressed through all the record positions. During this period, a 1 from the $\overline{Q}$ output of FF8 will produce a 0 from inverter 282. This latter signal will cause NAND circuit to generate a 1 on the write line 247. At the same time, a 1 will be generated at the output of NAND circuit 248 with the result that a 0 appears on the A/W line 252. A 0 will therefore be written into all of the memory locations as they are addressed by the position encoder. When the scanning operation is complete, the memory will be blank. The initialize flip-flop FF8 is set at the end of the scanning operation when the $\overline{\text{scanned out}}$ signal on a line 152 changes from 1 to 0, clocking in the J and K inputs. FF8 remains set for the remainder of the search unit's operation.

The select cycle, in which a 1 is written into the memory location corresponding to the selection chosen, is commenced by the generation of a select pulse on line 136 by the receiver portion in the manner described hereinabove. This select pulse sets the select flip-flop FF3, producing a 1 at the output of inverter 208 and enabling the write control clock pulse generator comprising components 210 to 218. When the first WCCP pulse occurs on line 220, the $\overline{Q}$ outputs of flip-flops FF4 to FF6 will be at 1, as will the $\overline{Q}_{erase}$ signal on line 442. As a result, a 0 is produced by NAND circuit 260, and a 1 is produced by inverter 262. Also, at this time, a 0 will normally appear on the $D_{out}$ line 430. Therefore, the first WCCP pulse will produce a 0 pulse at the output of NAND circuit 266, which in turn causes a 1 to appear at the output of NAND circuit 268, setting the scan counter.

In the manner described earlier, an A/W signal will be generated which begins on the leading edge of the second WCCP pulse and ends on the leading edge of the fourth WCCP pulse. Also, a write pulse beginning and ending with the third WCCP pulse will be generated on line 247. Finally, a $\overline{CS}$ pulse of level 0 will be generated in a manner to be described between the lagging edges of the second and third WCCP pulses — i.e., while the write control count is at two. These three signals cause a 1 play signal to be stored in the memory location corresponding to the number of the selection chosen. A 0 inhibit signal is generated on line 258 by NAND circuit 256 at the end of the first WCCP pulse when flip-flop FF4 turns on, producing a 1 at the output of NAND circuit 260. This signal is used to prevent the erroneous setting of the erase flip-flop during the select operation in a manner to be described.

When the write control counter 235 has counted to four, a 1 signal from the Q output of flip-flop FF6 sets flip-flop FF7, generating a reset signal on line 200. This signal resets the select flip-flop FF3 and the counter flip-flops FF4-FF6. Resetting the latter flip-flops causes the output of NAND circuit 260 to return to a 1 level. This generates a 1 on the inhibit line 258 and resets flip-flop FF7, thereby completing the select cycle.

In a similar manner, the erase cycle, in which the signal representing the selection played is erased from memory, is commenced by the $Q_{erase}$ signal on line 440. This signal produces a 1 at the output of inverter 208, enabling the WCCP generating circuit 210 and 218. At the same time the 0 $\overline{Q}_{erase}$ signal on line 442 produces a 1 at the output of NAND circuit 256, thereby producing a 0 on the inhibit line 258. A write pulse is generated on line 247 on the third WCCP pulse, as in the select cycle. Also as in the select cycle, a 0 $\overline{CS}$ signal is generated while the write control count is at two. In the erase cycle, however, the $\overline{Q}_{erase}$ signal on line 442, which is at 0, produces a 1 at the output of NAND circuit 248, inhibiting the 1 which would normally appear on the A/W line between the second and fourth WCCP pulses. As a result, a 0 is written into that memory location corresponding to the selection about to be played. When the write control counter counts to four, the Q output of flip-flop FF6 sets flip-flop FF7, which in turn resets the write control counter flip-flops FF4-FF6 and, in a manner to be described, the erase signals $Q_{erase}$ and $\overline{Q}_{erase}$. The 0 which now appears at the output of inverter 208 disables the WCCP generating circuit, and also causes a 1 to appear on the inhibit line 258. This completes the erase cycle.

Referring now to FIG. 6, I have illustrated the details of the magazine motor control, transfer motor control, toggle-shift control, and strobe pulse shaping circuits of the search unit. In the strobe pulse shaping circuit, a "strobe" signal, appearing on a line 448 from the encoder 480, is used to clock positional information from the encoding wheel into the latch 142 and into the motor control circuit. This strobe signal is first passed through an inverter 352, a bounce eliminate circuit 354, and a pulse-shaping circuit comprising components 356–364. An inverter 356, responsive to the output of the bounce eliminate circuit 354, feeds one input of a two-input NAND circuit 358, the other input of which is coupled to one terminal of resistors 360 and 362 and capacitor 364. Resistors 360 and 362 have their other terminals connected to a positive voltage source and to ground, respectively. NAND circuit 358 drives an inverter 366, the output of which is connected to the other terminal of capacitor 364, Enable line 450, carrying the shaped strobe pulse, is also derived from inverter 366. The enable signal, together with the $WC2\overline{Q}$ and $CE_W$ signals originating from the write control counter, are used to control the memory 350. A two-bit NOR circuit 372, the output of which is connected to the $\overline{CS}$ input to the memory, is responsive to outputs from NOR circuits 368 and 370. NOR circuit 368 is responsive to the $WC2\overline{Q}$ and $CE_W$ signals, while NOR circuit 370 is responsive to the enable and $CE_W$ signals. By this arrangement, the memory is enabled (allowed to read or write) whenever $CE_W$ is at logic 0 and either $WC2\overline{Q}$ or enable is also at logic 0.

Turning now to the magazine motor control circuit, a 2-bit "scan" counter, indicated generally by the reference numeral 415, includes D-type flip-flops FF11 and FF12. Flip-flops FF11 and FF12, the Q outputs of which provide the 1's place and 2's place counter outputs, respectively, both receive a set signal from the start scan line 446. The Q output of flip-flop FF11 drives the CP input of FF12, while the $\overline{Q}$ output of FF1 is used to drive both the D input of the same flip-flop and one input of a two-input NAND circuit 420. The $\overline{Q}$ output of flip-flop FF12 drives the D input of that flip-flop, and also the other input of NAND circuit 420. The output of NAND circuit 420 appears on scanned out line 152 and, in addition, is applied to an amplifier 422, the output of which appears on a "magazine motor control" line 426. This last line energizes a relay circuit (not shown) controlling the magazine motor 474.

Flip-flop FF11 is clocked by an encoding matrix, comprising circuits 374 to 390, which applies a 0 to the CP input of FF11 whenever the record magazine 472 passes either position 27 or 77. NOR circuit 390, which drives the CP input of flip-flop FF11, is responsive to outputs of NOR circuits 386 and 388. NOR circuit 386 is fed by NAND circuits 380 and 384, while NOR circuit 388 is fed by NAND circuits 382 and 384. NAND circuit 380 is responsive to the 10's, 20's, and 40's place encoding wheel outputs and the output of NOR circuit 374. NAND circuit 382 is responsive to the 20's place encoding wheel output, the output of NOR circuit 374, and the output of NOR circuit 376. NOR circuit 374 is responsive to the 80's place encoding wheel output and to the enable line 450. NOR circuit 376 is responsive to the 10's and 40's place encoding wheel outputs. NAND circuit 384 is responsive to the 1's, 2's, and 4's place encoding wheel output and to an inverter 378 which is fed by the 8's place encoding wheel output.

Scan counter 415 is set at three by a signal on the start scan line 446; this latter signal is generated by NAND circuit 268 whenever either the search unit is turned on, information comes in from a selection unit, or a selection has finished playing. This produces a 1 from NAND circuit 420, thereby generating a scanned out signal on line 152 and a magazine motor control signal on line 426. The latter signal controls the magazine motor 474.

A control mechanism (not shown) in the player 476 inhibits the operation of the magazine motor 474 whenever the transfer motor is actuated in playing a selection. It is necessary, however, to stop the magazine motor independently of the transfer motor after all of the memory positions have been addressed, as will occur either after the initialize operation or after a scanning operation performed on a blank memory. Otherwise, endless scanning will occur. This independent inhibiting means is provided by the counter 415, which counts down by one whenever a 0 pulse is produced by NOR circuit 390 which is whenever the record magazine 472 controlled by the magazine motor 474 passes either position 27 or 77. As long as the count remains above zero, NAND circuit 420 will continue to generate a 1, thereby maintaining the scanned out signal on line 152 and the magazine motor control signal on line 426. If positions 27 or 77 have been passed three times, indicating that the record magazine has made at least one complete revolution, the counter 415 will have counted down to zero, producing a 0 at the output of NAND circuit 420 and thereby turning off the scanned out signal and the magazine motor control signal.

Referring now to the transfer motor control circuit of FIG. 6, a "data output," or $D_{out}$ flip-flop FF9 is set and reset by 0's from inverters 396 and 398 respectively. Inverter 396 is responsive to NOR circuit 394, which is in turn responsive to the $\overline{D}_{out}$ signal from the memory 350 and to NAND circuit 284. NAND circuit 284 receives inputs from the inhibit line 258 and from the $Q_{initialize}$ line 444. Inverter 398 is responsive to the start scan signal on line 446. The Q output of flip-flop FF9, designated as "$D'_{out}$" is passed through inverters 402 and 410 onto the transfer motor control line 428. The $\overline{Q}$ output, designated as $\overline{D}'_{out}$ drives one input of a two-input NOR circuit 408 directly, and the other input through a DTL inverter 404. DTL inverter 408 also drives a capacitor 406, the other terminal of which is grounded. NOR circuit 408 produces a 0 when a steady-state $D'_{out}$ signal of either 1 or 0 is applied. When $\overline{D}'_{out}$ drops from 1 to 0, however, capacitor 406 temporarily holds the other input to NOR circuit 408 at 0, thereby producing a 1 pulse at the NOR circuit output. The output of NOR circuit 408 is applied to the set terminal of an erase flip-flop FF6, which controls the erase operation. The reset terminal of flip-flop FF10 is responsive to the $R_s$ signal on line 200. The Q and $\overline{Q}$ outputs of FF10 feed $Q_{erase}$ line 440 and $\overline{Q}_{erase}$ line 442, respectively.

While the record magazine is scanning for a selected record, the inhibit and $Q_{initialize}$ signals are at 1 and flip-flops FF9 and FF10 are at reset. When a 1 memory output occurs, indicating that a selection has been found, a 0 signal on $D'_{out}$ line 258 is twice inverted by circuits 394 and 396 to produce a 0 signal at the set terminal of flip-flop FF9, thereby setting it. This generates a signal on the transfer motor control line 428, inhibiting the operation of the magazine motor 474 and turning on the transfer motor which controls the playing of the record selected. The 1 to 0 level change in $D'_{out}$ when flip-flop FF10 is set produces a 0 pulse at the output of NOR circuit 408, setting the erase flip-flop FF10. The $Q_{erase}$ signal actuates the write control circuit in the manner previously described, causing a 0 to be written into the memory location corresponding to the record being played. When erasure has been completed, the erase flip-flop is reset by the $R_s$ signal on line 200. Flip-flop FF9 remains on until the record has finished being played, at which time the cam switch signal produces a start scan signal on line 446, resetting the $D_{out}$ flip-flop.

The $Q_{initialize}$ and inhibit signals applied to NAND circuit 284 inhibit the operation of the transfer motor control circuit under certain circumstances. When the system is initializing, the magazine motor must be able to scan all of the positions in order to insure complete erasure of the memory. During this period, the 0 signal on the $Q_{initialize}$ line produces a 1 from the NAND circuit 284, thereby holding the output of NOR circuit 394 at 1. As a result, flip-flop FF9 is prevented from being set by any 1's which were stored in the memory when the system is turned on, and which would otherwise cause the transfer motor to be turned on, stopping the magazine motor.

Similarly, when a 1 is being entered into the appropriate memory location in response to an incoming selection signal, the inhibit signal, generated by the write control circuit during the write cycle, is applied to an input of NAND circuit 284, thereby inhibiting the setting of the $D_{out}$ flip-flop FF9 or the erase flip-flop FF10.

Referring now to the toggle shift control circuit shown in FIG. 6, a NOR circuit 392 is responsive to the $D'_{out}$ signal and to the output of a two-input NAND circuit 292. NAND circuit 292, which in addition drives an L/R (left/right) line 456, is responsive to the output of NAND circuits 288 and 294. NAND circuit 288 derives one input from the A/W line 252, and a second input from the left line 286 originating from the shift register 144 shown in FIG. 5. NAND circuit 294 derives one input from an inverter 290 driven by the A/W line 252, and a second input from the Q output of an L/R (left/right) flip-flop FF13, which is a D-type flip-flop. The Q output and $\overline{Q}$ output of flip-flop FF13 have been labeled as L/R Q and L/R $\overline{Q}$, respectively, and appear on respective lines 460 and 462. The D input is connected to the $\overline{Q}$ output, while the CP input of FF13 is connected to an inverter 298 which in turn is responsive to a DTL inverter 300. The output of inverter 300 is also connected to ground through a capacitor 302.

Inverter 300 is driven by a DTL NAND circuit 304, which also drives a DTL inverter 306. Inverter 306 drives a second DTL inverter 308, which has a capacitor 310 bridging its input and output terminals. Inverter 308 drives one input to NAND circuit 304. A second input to NAND circuit 304 is driven by a NOR circuit 312, inputs to which are provided by the $\overline{enable}$ line 450 and a NOR circuit 314. NOR circuit 314 in turn receives inputs from the $\overline{Q}_{initialize}$ line 444a and NOR circuit 316. Inputs to NOR circuit 316 are provided by the $D'_{out}$ line and by an inverter 318 connected to the inhibit line 258.

L/R flip-flop FF13 stores a side-of-record bit — that is, a 1 or a 0 according to whether the side of concern is the left or the right side, respectively. This information is used to actuate the toggle shift control which determines the side of the record being played, to address the memory during the scan and erase cycles, and to provide side-of-record data to the selection units. It will be seen that components 298 to 310 form a gated pulse generating circuit which is enable whenever a 1 appears at the output of NOR circuit 312. It will also be seen that L/R line 456, which drives one of the address inputs to the memory 350 (FIG. 5), will carry the L/R Q signal, except for that period in the write cycle when the A/W line goes positive; components 286 and 294 in effect make up a ninth-bit extension to the multiplex 146 shown in FIG. 5.

During the entire initialize cycle, as has already been explained, a 0 and a 1, respectively, are applied to the $D_{in}$ and R/W inputs to the memory 350. It will be recalled that $\overline{Q}_{initialize}$ is, at this time, 1. As the record magazine advances through each of its positions in the initialize cycle, as $\overline{enable}$ pulse actuates the gated clock 298-310 to cause the L/R flip-flop FF13 to assume each of its states at least once, thereby providing both a 0 and a 1 to address input Y8 (FIG. 5). At the same time, as has been described above, encoding wheel bits 80-1 are impressed in a suitably encoded form upon the remaining memory address inputs. Also at the same time, the concurrence of 0 $CE_r$ and $\overline{enable}$ signals enables the memory 350 by producing a 0 $\overline{CS}$ signal on line 458. As a result of all of these events, a 0 is written into both the right and the left-side memory locations corresponding to that position of the record magazine. When the record magazine advances through all of its positions, all of the memory locations used will have been erased.

Flip-flop FF13 is also clocked in response to an $\overline{enable}$ pulse during the scan cycle. While this cycle is taking place, however, $\overline{Q}_{initialize}$ and $D'_{out}$ are 0, while inhibit is at 1. Also, a 0 is applied to the R/W input of the memory 350 so that reading only takes place. The $\overline{CS}$ line 458 is controlled by the $\overline{enable}$ signal as it was during the initialize cycle. Thus, as the record magazine advances through its positions during the scan cycle, the corresponding memory locations, both left and right, are read. The signal on line 456 is inhibited from actuating the toggle shift control, however, by a 1 $D'_{out}$ signal which is applied to NOR circuit 392. When a 1 is found in the memory 350 during scanning, $D'_{out}$, as stated before, goes positive, producing a 0 at the output of NOR circuit 316 and thereby inhibiting flip-flop FF13 from being further clocked; $\overline{D}'_{out}$, now 0, allows the side-of-record signal on line 456 to appear (inverted) on line 424 and actuate the toggle shift control to play the proper side of the record. The side-of-record signal stored in FF13 is also conveyed by lines 460 and 462 to the shift register 144 for transmission, together with positional information, to the remote selectors. When $D'_{out}$ is set in response to the cam switch signal generated on line 276 at the end of a record, line 424 returns to its quiescent level of 0.

The toggle shift control circuit is also active during the write cycle. When an A/W pulse is generated on line 252 during that cycle, the signal on left line 286, containing side-of-record information originating from a selector, is transmitted through NAND circuits 288 and 292 onto line 456, where it is used to address the proper "side" of the memory 350.

Having described in detail the preferred embodiment of my search unit, I will briefly summarize its operation. It will be assumed, for the purposes of discussion, that the search unit is in its normal mode of operation and that a selection is being played. When a selection is being played, the number of the record remains stored in the latch 142 shown in FIG. 5, while the side of the record bearing the selection remains stored in flip-flop FF13, shown in FIG. 6, coupled to the shift register 144 of FIG. 5 by lines 460 and 462. Every thirty-two periods of the clock pulse train on line 54, the transmitting circuit shown in FIG. 3 generates a preset pulse on line 128, loading the shift register 144 with the contents of the latch 142 and the flip-flop FF13, and thereafter generates a ten-pulse train on line 130, serially shifting the contents of the register 144 out onto line 140, which line is coupled to the data line 468 of FIG. 3 running to the remote selectors. A train of ten clock pulses, synchronized with the pulses on line 130, is also applied to the data clock line 470 running to the selectors. By this means, information representing the record being played is periodically transmitted to the remote selectors.

When the selection has ended, the player mechanism generates a signal on line 276 of FIG. 4, which in turn causes a signal to be generated on line 446.. This latter signal causes a three to be stored in the scan counter 415 of FIG. 6 and also resets flip-flop FF9, removing the transfer motor control signal from line 428. When the transfer motor is disabled, the magazine 474 is energized and rotates the record magazine 472 successively through its positions.

While the magazine 472 is being rotated, both 446. left-side and the right-side locations in the memory 350 corresponding to the current position of the magazine are searched for a play signal indicating that the side is to be played. Position data, generated on lines 482a to h by the encoding wheel 480 and representing the current position of the record magazine 472, is strobed into the latch 142 and is also applied to the address inputs X1 to X8 and Y1 to Y4 of the memory 350 through the multiplex 146, thereby providing the memory 350 with the "record" (second and third digit) portion of an address. At the same time, the strobe pulse on line 448 causes a pulse to be generated on line 450, enabling the gated clock circuit of FIG. 6 which drives flip-flop FF13. The output of FF13 is applied on line 456 to the Y8 address input of the memory 350, providing it with the "side-of-record" (first digit) portion of an address.

When a location is addressed in this fashion which contains a play signal, line 432 goes to 0, setting FF9 of FIG. 6. When set, flip-flop FF9 inhibits the gated clock so that FF13 continues to store the side of the record to be played, generates a signal on line 428 to stop the magazine motor 474 and to cause the record then in position to be played, and sets the erase flip-flop FF10 to cause the write control circuit FIG. 4 to erase the memory location corresponding to the selection to be played. Because the latch 142 may be loaded only when a pulse is generated on line 450 in response to a strobe pulse on line 448, latch 142 continues to store the magazine position number of the record to be played. The new data stored in the latch 142 and flip-flop FF13, corresponding to the new record being played, is transmitted to the remote selectors in the manner described previously.

If the memory 350 is blank, indicating that no records remain to be played, the magazine 472 continues to rotate until it has passed either position 27 or 77 at least three times, at which time the scan counter 415 has counted down to zero, generating a 0 signal on line 152 which inhibits further transmission of data to the remote selectors, and a 0 signal on line 426, turning off the magazine motor 474.

Selection signals representing selections to be played are transmitted from the remote selectors 466a and 466b to the search unit 464 during the quiescent portions of the thirty-two clock period search unit transmission cycle in order to eliminate the possibility of interference. Incoming clock pulses on data clock line 470 cause pulses to be generated on line 130, clocking the incoming data on line 468 into the shift register 144. After the tenth pulse on line 130 clocks the last bit of incoming data into the register 144, a select signal is generated on line 136 and is fed to the write control circuit of FIG. 4 to place the search unit in a selective mode and to cause that circuit to load a 1 onto the memory location corresponding to the incoming selection identification number, now stored in the shift register 144. Record and side-of-record information stored in the register 144 are provided to the memory 350 for this purpose through the multiplex 146 and through circuits 288 and 292 of FIG. 6 respectively. Also at this time, if the search unit is currently scanned out, the write control circuit provides a start scan signal on line 446 in response to the select signal on line 136, restarting the scan cycle when, after the write cycle is completed, the search unit resumes its normal mode of operation.

It will be seen that I have accomplished the object of my invention. My search unit transmits to remote selectors a signal representing the record being played. It does not require a multiplicity of transmission lines. It is compact, and is simple and certain in operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an automatic phonograph system in which selections are identified by respective multidigit selection identification numbers, apparatus including
   a. user actuated selector means for generating a selection signal representing a desired selection,
   b. display means responsive to a display signal corresponding to a particular selection for displaying the identification number of particular selection,
   c. means for generating a position signal representing the selection in position for play, each of said selection, display, and position signals comprising a binary coded representation of a selected identification number,
   d. a shift register capable of storing a signal representing the selection identification number,
   e. transmitting means for cyclically loading the shift register with the position signal and then shifting the position signal out of said register and transmitting the same as a display signal to the display means,
   f. receiving means responsive to the generation of a selection signal by the selector means for inhibiting said transmitting means and loading the selection signal into the shift register,
   g. a memory having a plurality of normally blank locations corresponding to the number of selections offered, said locations adapted to be loaded with positive play signals to indicate that the corresponding selection is to be played, and
   h. means responsive to the loading of a complete selection signal into the shift register for writing a play signal into the memory location corresponding to the number represented by said selection signal.

2. Apparatus as in claim 1 in which the display signal transmitted by said transmitting means and the selection signal generated by the selector means comprise respective serial trains of data bits.

3. Apparatus as in claim 2 in which the selector means also generates a train of clock pulses in snychronization with the data bits forming the selection signal, and in which the transmitting means also transmits a train of clock pulses in synchronization with the data bits forming the display signal.

4. Apparatus as in claim 3 in which the receiving means loads the bits forming the selection signal into the shift register in response to the clock pulses generated by the selector means.

5. Apparatus as in claim 1 in which the means for providing a position signal includes a plurality of output lines corresponding to the number of bits in the position signal and simultaneously provides each of the bits forming the position signal over a separate one of said output lines, and in which the transmitting means simultaneously loads each of said bits into the shift register.

6. Apparatus as in claim 1, and further including record playing means adapted to play the selection then in position for play in response to a first control signal, means responsive to the position signal for reading the memory location corresponding to the position signal, and means responsive to the detection of a play signal by said reading means for erasing the contents of the location read and generating a first control signal.

7. Apparatus as in claim 6 in which said record playing means provides an end-of-play signal at the end of a record, said apparatus including means responsive to the end-of-play signal for terminating the first control signal.

8. Apparatus as in claim 6 in which the position signal means comprises means for providing a magazine position signal representing the record in position for play, a bistable storage device adapted to store a side-of-record signal representing the side of a record, and means for providing a position signal comprising said magazine position and side-of-record signals.

9. Apparatus as in claim 8 and further including clocking means for periodically changing the state of the bistable storage device and means responsive to the detection of a play signal by said reading means for inhibiting said clocking means.

10. Apparatus as in claim 8 in which the record playing means is adapted to play the side of a record as determined by the side-of-record signal.

11. Apparatus as in claim 6 in which said record playing means brings other selections into position for play in response to a second control signal, said apparatus further including scanning means responsive to the presence of at least one play signal in the memory for providing a second control signal.

12. Apparatus as in claim 11 in which said scanning means includes a counter, means responsive to the assumption by the position signal of one of a predetermined set of values for advancing the counter, means for providing a second control signal, and means responsive to a predetermined count of said counter for inhibiting said second control signal means.

13. Apparatus as in claim 12 and further including means responsive to the transmission of a selection signal by a selector for resetting the counter.

14. Apparatus as in claim 12 in which the record playing means provides an end-of-play signal at the end of a record, and further including means responsive to the end-of-play signal for resetting the counter.

15. In an automatic phonograph in which selectors are identified by respective multidigit numbers, apparatus including
 a. a transmission line,
 b. user actuated selector means for generating a selection signal representing a desired selection and applying the signal to the transmission line,
 c. display means responsive to a display signal on the transmission line representing a selection being played for displaying the identification number of the particular selection,
 d. means for generating a position signal representing the selection in position for play, each of said selection, display and position signals comprising a binary coded representation of a selection identification number,
 e. a shift register capable of storing a signal representing said selection identification number,
 f. transmitting means for cyclically loading the shift register with the position signal and then shifting the position signal out of said register and applying the same as a display to the transmission line,
 g. receiving means responsive to a signal on the transmission line for inhibiting said transmitting means and for loading the signal appearing on the transmission line into the shift register,
 h. a memory having a plurality of normally blank locations corresponding to the number of selections offered, said locations adapted to be loaded with positive play signals to indicate that the corresponding selection is to be played,
 i. means responsive to the loading of a complete signal into the shift register by said receiving means for writing a play signal into the memory location corresponding to the number represented by said signal, and
 j. means for rendering the receiving means inoperative while the transmitting means is applying a display signal to the transmission line.

16. In an automatic phonograph system in which selections are identified by respective multi-digit selection identification numbers, one digit of which represents the side of the record and the remaining digits of which represent the record, apparatus including:
 a. record magazine means having a plurality of records and adapted to provide a magazine position signal comprising a binary coded representation of the record in position for play, to provide an end-of-play signal when a record has finished being played, to bring other records successively into position for play whenever a first control signal is absent and to play the side of a record in accordance with a side-of-record signal,
 b. a memory having a plurality of normally blank locations corresponding to the number of selections offered, said locations adapted to be loaded with positive play signals to indicate that the corresponding selection is to be played,
 c. a first bistable flip-flop adapted to provide a side-of-record signal representing the side of a record,
 d. clocking means for periodically changing the state of the first bistable flip-flop at a rate sufficient to cause said first bistable flip-flop to assume each of its states at least once during the time each record is successively brought into position for play by said record magazine means,
 e. a second bistable flip-flop adapted to provide a first control signal,
 f. reading means responsive to the magazine position signal and to the side of record signal for reading the memory location corresponding to said signals and for generating a memory output signal if a play signal is found in the location read, g. means responsive to the memory output signal for erasing the location read by said reading means and for setting the second flip-flop, h. means responsive to the end of play signal for resetting the second flip-flop, and i. means responsive to the first control signal for inhibiting the clocking means.

17. Apparatus as in claim 16 including means for generating a selection signal comprising a binary coded representation of the identification number of a desired selection, writing means responsive to said selection signal for inhibiting the reading means and for entering a play signal into the memory location corresponding to the selection signal.

18. Apparatus as in claim 17 in which the memory has a common address input for both reading and writing, and in which the writing means includes means normally providing the address input with a position signal coprising the magazine position and side-of-record signal, and means responsive to the selection signal for providing the address input with said selection signal.

19. Apparatus as in claim 16 in which said reading means includes latching means for storing the magazine position signal most recently provided by the record magazine means.

* * * * *

UNITED STATES PATENT AND TRADEMARK OFFICE
CERTIFICATE OF CORRECTION

PATENT NO. : 3,964,025
DATED : June 15, 1976
INVENTOR(S) : Gerard J. Oosterhouse It is certified that error appears in the above-identified patent and that said Letters Patent are hereby corrected as shown below:

Column 20, line 37, after "of" insert -- the --;

line 41, "selected" should read -- selection --;

line 68, "sny-" should read -- syn- --;

Column 22, line 18, after "display" insert -- signal --;

Column 24, line 7, "coprising" should read -- comprising --

Signed and Sealed this

Seventh Day of September 1976

[SEAL]

Attest:

RUTH C. MASON
Attesting Officer

C. MARSHALL DANN
Commissioner of Patents and Trademarks